(12) United States Patent
Liu et al.

(10) Patent No.: US 11,370,503 B2
(45) Date of Patent: Jun. 28, 2022

(54) SINGLE-WHEELED BALANCE VEHICLE

(71) Applicant: Freeman IT Limited, Shenzhen (CN)

(72) Inventors: Haibo Liu, Shenzhen (CN); Feng Xie, Shenzhen (CN)

(73) Assignee: FREEMAN IT LIMITED, Shenzhen (CN)

( * ) Notice: Subject to any disclaimer, the term of this patent is extended or adjusted under 35 U.S.C. 154(b) by 242 days.

(21) Appl. No.: 16/652,554

(22) PCT Filed: Oct. 11, 2018

(86) PCT No.: PCT/CN2018/109750
§ 371 (c)(1),
(2) Date: Mar. 31, 2020

(87) PCT Pub. No.: WO2019/114392
PCT Pub. Date: Jun. 20, 2019

(65) Prior Publication Data
US 2020/0239096 A1   Jul. 30, 2020

(30) Foreign Application Priority Data

Dec. 12, 2017  (CN) .......................... 201721730983.X
Jun. 22, 2018  (CN) .......................... 201820975632.3

(51) Int. Cl.
*B62K 1/00* (2006.01)
*B62K 11/00* (2006.01)
*B60L 50/60* (2019.01)

(52) U.S. Cl.
CPC .............. *B62K 1/00* (2013.01); *B62K 11/007* (2016.11); *B60L 50/66* (2019.02); *B60L 2200/14* (2013.01);
(Continued)

(58) Field of Classification Search
CPC .... B62K 1/00; B62K 11/007; B62K 2204/00; B60L 2200/14; B60L 2260/34
See application file for complete search history.

(56) References Cited

U.S. PATENT DOCUMENTS 3,399,742 A * 9/1968 Malick ...................... B60T 1/06
                                                              180/21
4,109,741 A   8/1978 Gabriel .......................... 180/21
(Continued)

FOREIGN PATENT DOCUMENTS

CN    105905204 A    8/2016
CN    107867359 A    4/2018
(Continued)

OTHER PUBLICATIONS

Yamamoto et al., Pneumatic Tire and Method of Manufacturing the Same, EPO, WO 2005/047028 A1, Machine Translation of Description (Year: 2005).*

(Continued)

*Primary Examiner* — James A English
(74) *Attorney, Agent, or Firm* — Stein IP, LLC

(57) ABSTRACT

A single-wheeled balance vehicle comprises a motor, pedals, a wheel, a power module and a control module. The motor comprises a motor housing and a spindle. The power module and the control module are fixed to the spindle. The power module comprises at least one power unit. The control module comprises a first control unit electrically connected to the power unit and the motor. The two ends of the spindle are fixedly connected to the pedals respectively. The wheel is of a hollow structure having two ends formed with openings, is arranged on the motor housing in a sleeving manner and is fixedly connected to the motor housing. The power module and the control module are located in the wheel. Miniaturization of the single-wheeled balance (Continued)

vehicle is facilitated, and the service life of the single-wheeled balance vehicle is prolonged.

8 Claims, 4 Drawing Sheets

(52) U.S. Cl.
CPC ....... *B60L 2260/34* (2013.01); *B62K 2204/00* (2013.01)

(56) References Cited

U.S. PATENT DOCUMENTS

| | | | | |
|---|---|---|---|---|
| 8,353,378 | B2* | 1/2013 | Gomi | B62K 1/00 180/218 |
| 8,513,917 | B2* | 8/2013 | Gomi | B62K 1/00 320/109 |
| 2011/0067935 | A1* | 3/2011 | Gomi | B62K 1/00 180/21 |
| 2015/0239521 | A1* | 8/2015 | Fang | B62K 21/00 180/6.48 |
| 2017/0088225 | A1* | 3/2017 | Ying | B62D 51/02 |
| 2017/0120139 | A1* | 5/2017 | Ma | A63C 17/12 |
| 2017/0334501 | A1* | 11/2017 | Lin | B62K 1/00 |
| 2018/0099720 | A1 | 4/2018 | Chen | 11/7 |
| 2018/0326294 | A1* | 11/2018 | Ma | B62K 1/00 |
| 2020/0282767 | A1* | 9/2020 | Liu | B60B 9/14 |

FOREIGN PATENT DOCUMENTS

| | | | |
|---|---|---|---|
| CN | 207241888 U | 4/2018 | |
| EP | 3190036 A1 | 7/2017 | |
| EP | 3 536 589 A1 | 3/2019 | |
| WO | WO-2005047028 A1 * | 5/2005 | ............. B60C 13/00 |

OTHER PUBLICATIONS

International Search Report dated Mar. 18, 2019, issued to International Application No. PCT/CN2018/109750.
Supplementary European Search Report in counterpart European application 18889401.8 dated Oct. 19, 2021.

* cited by examiner

SINGLE-WHEELED BALANCE VEHICLE

CROSS-REFERENCE TO RELATED APPLICATIONS

This application is a national stage of International Application No. PCT/CN2018/109750, filed Oct. 11, 2018, which claims the benefit of Chinese Application No. 201721730983.X, filed Dec. 12, 2017, and Chinese Application No. 201820975632.3, filed Jun. 22, 2018 in the China National Intellectual Property Administration, the disclosures of which are incorporated herein by reference.

TECHNICAL FIELD

The invention relates to balance vehicles, in particular to a single-wheeled balance vehicle.

DESCRIPTION OF RELATED ART

Single-wheeled balance vehicles typically include a shell, a power module, a motor and a control module, wherein the control module is electrically connected to the power module and the motor, the shell is fixed to the spindle of the motor, the power module is arranged on one side of the shell, and the control module is arranged on the side, away from a first control unit, of the shell.

The control module and the power module are arranged outside the shell and thus can be conveniently maintained by users. However, once a collision happens to the single-wheeled balance vehicles, the control module and the power module may be damaged, and the service life of the single-wheeled balance vehicles is severely affected.

Therefore, it is necessary to provide a durable single-wheeled balance vehicle.

BRIEF SUMMARY OF THE INVENTION

The technical issue to be settled by the invention is to provide a durable single-wheeled balance vehicle.

The technical solution adopted by the invention to settle the above technical issue is as follows: a single-wheeled balance vehicle comprises a motor, pedals, a wheel, a power module and a control module, wherein the motor comprises a motor housing and a spindle, the power module and the control module are fixed to the spindle, the power module comprises at least one power unit, and the control module comprises a first control unit electrically connected to the power unit and the motor; and the two ends of the spindle are fixedly connected to the pedals respectively, the wheel is of a hollow structure having two ends formed with openings, is arranged on the motor housing in a sleeving manner and is fixedly connected to the motor housing, and the power module and the control module are located in the wheel.

The invention has the following beneficial effects: the power module and the control module are received in the wheel to be protected against accidental damage when the single-wheeled balance vehicle is impacted, and the service life of the single-wheeled balance vehicle is prolonged; the power module and the control module are received in the wheel, so that the size of the single-wheeled balance vehicle is reduced; and a shell is not needed, so that the production cost of the single-wheeled balance vehicle is reduced.

Figure 1:
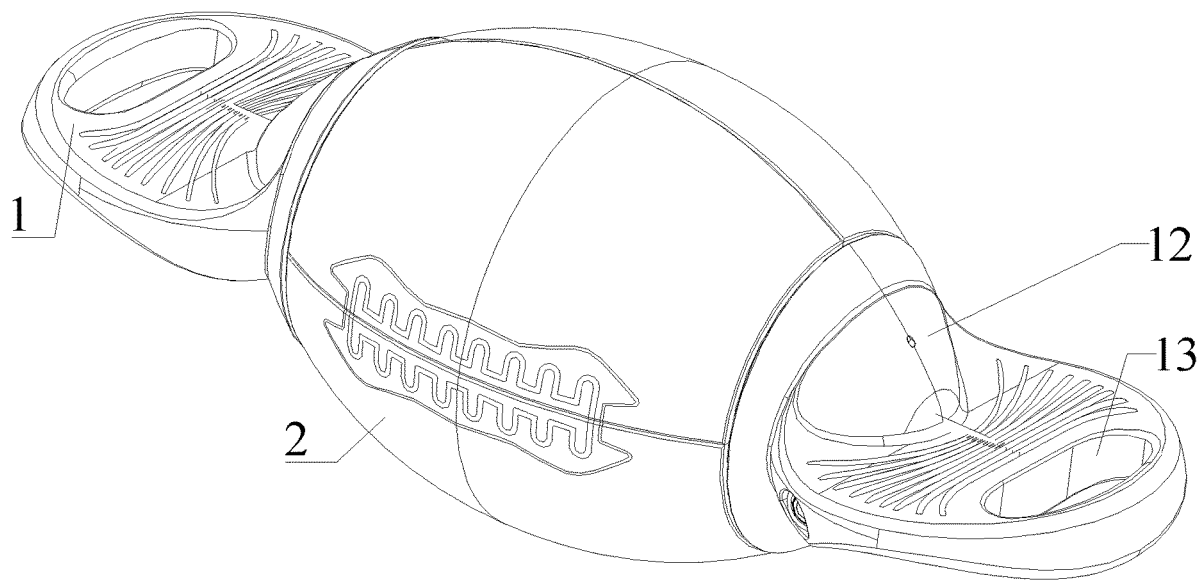
FIG. 1 is an overall structural view of a single-wheeled balance vehicle in Embodiment 1 of the invention.

REFERENCE SIGNS 1, pedal; 2, wheel; 21, sleeve; 22, lining; 23, second limit part; 24, limit groove; 3, motor housing; 31, first limit part; 4, spindle; 5, first power unit; 51, bracket;
52, battery; 53, receding groove; 6, second power unit; 7, first control unit;
8, second control unit; 9, end cover; 91, third limit part; 92, limit ring; 10, bearing; 11, gasket;
12, shield plate; 13, handle hole; 14, fixing part; 141, lantern ring;
142, fixing plate; 143, via hole.

DETAILED DESCRIPTION OF THE INVENTION

The technical solutions, objectives and effects of the invention are expounded below in combination with the embodiments and accompanying drawings.

The key concept of the invention lies in that a power module and a control module are arranged in a wheel, and that a power unit and a control unit are respectively arranged on the two sides of a motor housing.

Referring to FIG. 1 to FIG. 5, a single-wheeled balance vehicle comprises a motor, pedals 1, a wheel 2, a power module and a control module, wherein the motor comprises a motor housing 3 and a spindle 4, the power module and the control module are fixed to the spindle 4, the power module comprises at least one power unit, and the control module comprises a first control unit 7 electrically connected to the power unit and the motor; and the two ends of the spindle 4 are fixedly connected to the pedals 1 respectively, the wheel 2 is of a hollow structure having two ends formed with openings, is arranged on the motor housing 3 in a sleeving manner and is fixedly connected to the motor housing 3, and the power module and the control module are located in the shell 2.

From the above description, the invention has the following beneficial effects: the power module and the control module are received in the wheel to be protected against accidental damage when the single-wheeled balance vehicle is impacted, so that the service life of the single-wheeled balance vehicle is prolonged; the power module and the control module are arranged in the wheel, so that the size of the single-wheeled balance vehicle is reduced; and a shell is not needed, so that the production cost of the single-wheeled balance vehicle is reduced.

Furthermore, the wheel 2 comprises a sleeve 21 and a columnar lining 22, wherein the sleeve 21 is arranged outside the lining 22 in a sleeving manner and is fixedly connected to the lining 22, the lining 22 is arranged on the motor housing 3 in a sleeving manner and is fixedly connected to the motor housing 3, and the motor housing 3 is located in the middle portion of the lining 22.

From the above description, the lining is made from a hard material (such as aluminum alloy or carbon fibers), and the sleeve is made from a flexible material (such as plastic or rubber), so that the lining has sufficient strength and will not deform, which may otherwise squeeze the power module and the control module.

Furthermore, first limit parts 31 are arranged on the outer circumferential wall of the motor housing 3 in an axial direction, and second limit parts 23 matched with the first limit parts 31 are arranged on the inner circumferential wall of the wheel 2.

From the above description, the first limit parts are protrusions or grooves to realize transmission between the motor housing and the wheel. Preferably, the first limit parts are convex strips arranged in the axial direction of the spindle.

Furthermore, the single-wheeled balance vehicle further comprises two end covers 9 which are rotatably arranged around the spindle 4, the motor housing 3 is located between the two end covers 9, each end cover 9 is a cylindrical shell of a hollow structure having an end formed with an opening, the outer diameter of the end covers 9 is equal to that the motor housing 3, and the end covers 9 are fixedly connected to the motor housing 3 and are located in the wheel 2; and the power module and the control module are respectively received in the hollow structures of the end covers 9.

From the above description, the end covers are able to further protect the power module and the control module.

Furthermore, third limit parts 91 matched with the second limit parts 23 are arranged on the outer circumferential walls of the end covers 9 and are in one-to-one correspondence with the first limit parts 31.

From the above description, the end covers are provided with the third limit parts matched with the second limit parts, thus being able to transmit power to the wheel.

Furthermore, the openings of the two end covers 9 are arranged face to face.

From the above description, the openings of the end covers face the motor housing, so that dust and moisture are prevented from entering the control (and/or power) module, the operating stability of the control module and the power module is guaranteed, and the service life of the single-wheeled balance vehicle is further prolonged.

Furthermore, a limit ring 92 is arranged at the bottom of each end cover 9 in a radial direction, and limit grooves 24 matched with the limit rings 92 are formed in the openings at the two ends of the wheel 2.

From the above description, the wheel is limited between the two limit rings to be prevented against deviation.

Furthermore, the single-wheeled balance vehicle further comprises a fixing part 14, the spindle 4 has a screw hole, the fixing part 14 has a via hole 143 aligned to the screw hole and comprises a lantern ring 141 and a fixing plate 142, the lantern ring 141 is arranged around the spindle 4 and is connected to the fixing plate 142, and the first control unit 7 comprises a PCB fixed to the fixing plate 142.

Furthermore, the power unit comprises a bracket and a battery arranged on the bracket, and the bracket has a receding groove for avoiding the lantern ring 141, and is fixed to the fixing plate 142 and located on the side, away from the PCB, of the fixing plate 142.

From the above description, the power unit and the first control unit are respectively located on the two sides of the fixing part, so that the space occupied by the power module and the power module is drastically reduced, and miniaturization of the single-wheeled balance vehicle is facilitated.

Furthermore, each pedal 1 comprises an arc-shaped shield plate 12 which shields one opening of the wheel 2.

From the above description, the arc-shaped shield plates on the pedals can prevent dust from entering the single-wheeled balance vehicle via the openings of the wheel, so that the service life of the single-wheeled balance vehicle is further prolonged.

Embodiment 1

Referring to FIG. 1-FIG. 5, in Embodiment 1 of the invention, a single-wheeled balance vehicle comprises a motor, pedals 2, a wheel 2, a power module and a control module, wherein the motor comprises a motor housing 3 and a spindle 4, the power module and the control module are fixed to the spindle 4, the power module comprises at least power unit, and the control module comprises a first control unit 7 electrically connected to the power unit and the motor; and the two ends of the spindle 4 are fixedly connected to the pedals 1 respectively, the wheel is of a hollow structure having two ends formed with openings, is arranged on the motor housing 3 in a sleeving manner, and is fixedly connected to the motor housing 3, and the power unit and the control unit are located in the wheel 2.

In this embodiment, the power module comprises a first power unit 5 and a second power unit 6, the first control unit 7 is electrically connected to the first power unit 5, the second power unit 6 and the motor, and the motor housing 3 is located between the first power unit 5 and the second power unit 6.

Optionally, the control module further comprises a second control unit 8 electrically connected to the first control unit 7; the motor housing 3 is located between the first control unit 7 and the second control unit 8, that is, the first control unit 7 and the first power unit 5 are located on one side of the motor housing 3, and the second control unit 8 and the second power unit 6 are located on the other side of the motor housing 3. In this embodiment, the wheel 2 is of a foot-shaped hollow structure having two ends formed with openings.

Figure 3:
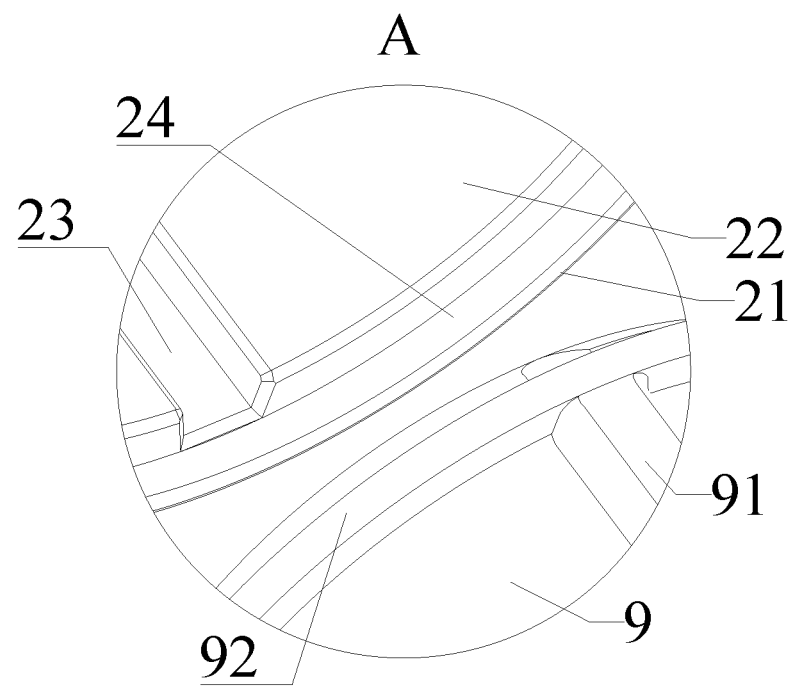
FIG. 3 is an enlarged view of part A in FIG. 2.

As shown in FIG. 3, the wheel 2 preferably comprises an elastic sleeve 21 and a columnar hard lining 22, wherein the sleeve 21 is arranged outside the lining 22 in a sleeving manner and is fixedly connected to the lining 22, the lining 22 is arranged on the motor housing 3 in a sleeving manner and is fixedly connected to the motor housing 3, and the motor housing 3 is located in the middle portion of the lining 22.

First limit parts 31 are arranged on the outer circumferential wall of the motor housing 3 in an axial direction, and second limit parts 23 matched with the first limit parts 31 are arranged on the inner circumferential wall of the wheel 2.

The single-wheeled balance vehicle further comprises two end covers 9 which are rotatably arranged around the spindle 4, the motor housing 3 is located between the two end covers 9, each end cover is a cylindrical shell of a hollow structure having an end formed with an opening, the outer diameter of the end covers 9 is equal to that of the motor housing 3, and the end covers 9 are fixedly connected to the motor housing 3 and are located in the wheel 2; and the power module and the control module are received in the hollow structures of the end covers 9.

The single-wheeled balance vehicle further comprises bearings 10 and gaskets 11 which are arranged around the spindle 4, a through hole is formed in the bottom of each end cover 9, and the bearings 10 are located in the through holes.

Third limit parts 91 matched with the second limit parts 23 are arranged on the outer circumferential walls of the end covers 9 and are in one-to-one correspondence with the first limit parts 31.

In this embodiment, the first limit parts 31 and the third limit parts 91 are limit convex strips, and the second limit parts 23 are limit grooves. In addition, in this embodiment, the end covers 9 are connected to the motor housing 3 through bolts. Particularly, limit holes are correspondingly formed in the first limit parts and the third limit parts, and the bolts are located in the limit holes.

Preferably, the openings of the two end covers 9 are arranged face to face.

As shown in FIG. 3, furthermore, a limit ring 92 is arranged at the bottom of each end cover 9 in a radial direction, and limit grooves 24 matched with the limit rings 92 are formed in the openings at the two ends of the wheel 2.

Figure 2:
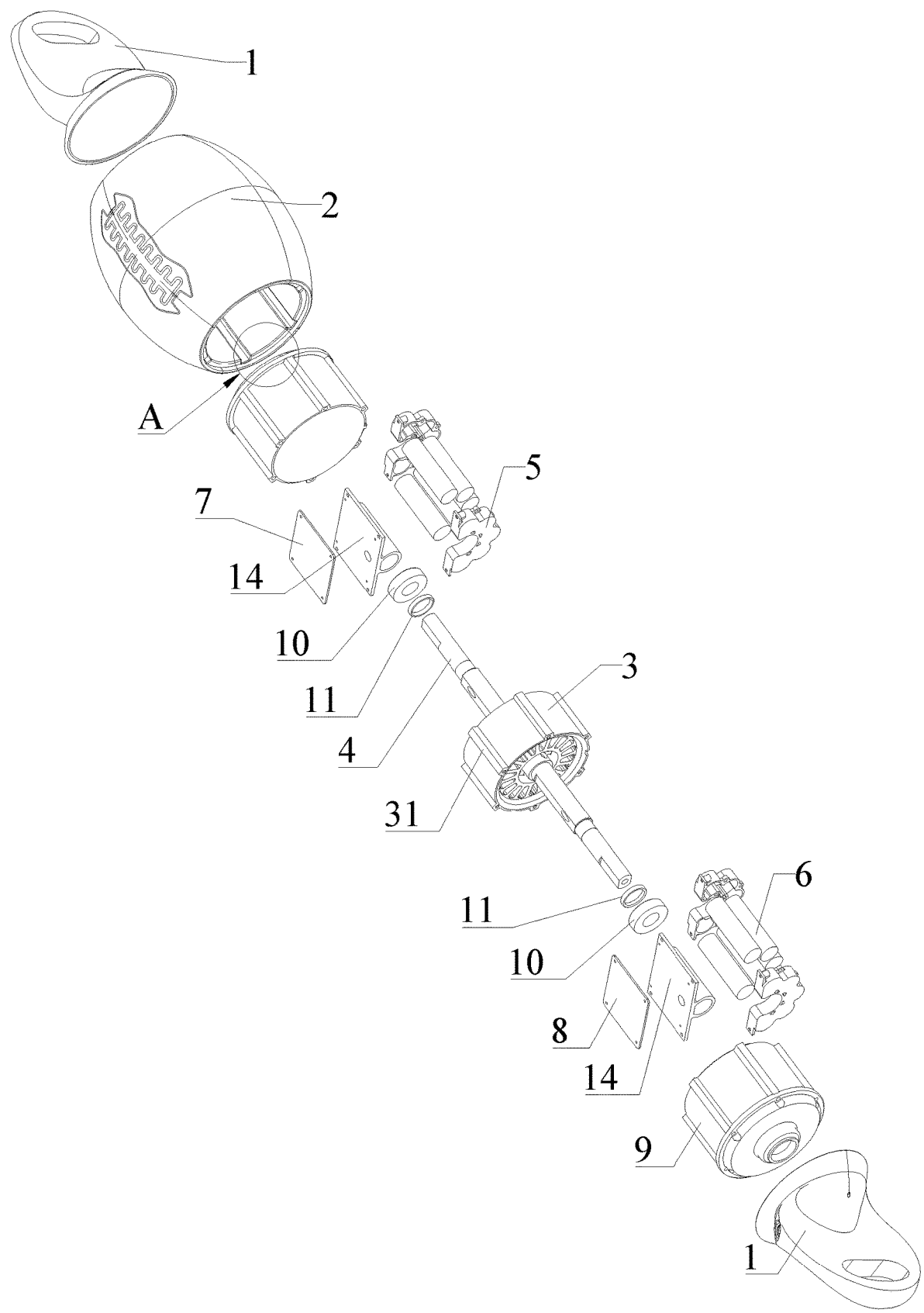
FIG. 2 is an exploded view of the single-wheeled balance vehicle in Embodiment 1 of the invention.
Figure 4:
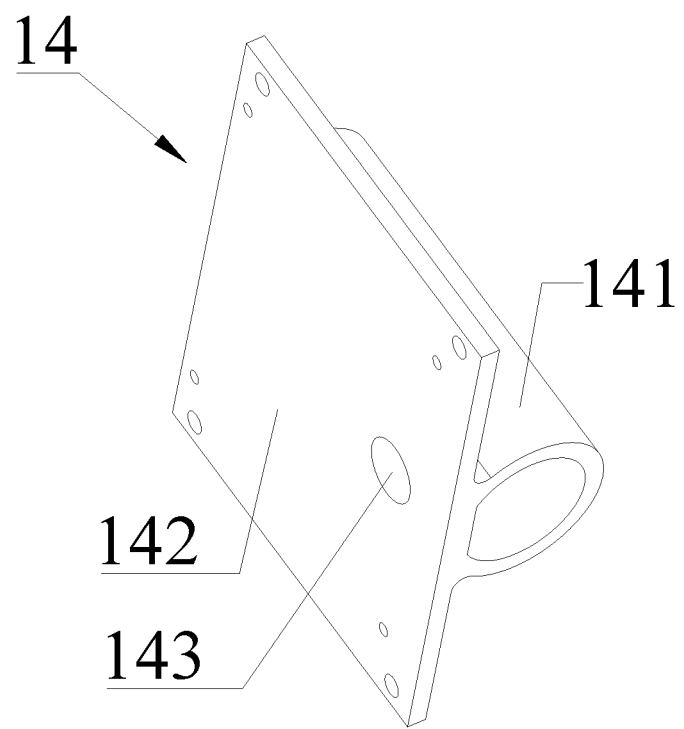
FIG. 4 is a structural view of a fixing part of the single-wheeled balance vehicle in Embodiment 1 of the invention.

As shown in FIG. 2 and FIG. 4, in this embodiment, in order to reduce the size of the size of the single-wheeled balance vehicle, the single-wheeled balance vehicle further comprises a fixing part 14, the spindle 4 has a screw hole, and the fixing part 14 has a via hole 143 aligned to the screw hole; the fixing part 14 comprises a lantern ring 141 and a fixing plate 142, and the lantern ring 141 is arranged around the spindle 4 and is connected to the fixing plate 142; and the first control unit 7 comprises a PCB fixed to the fixing plate 142. The via hole 143 penetrates through the fixing plate 142 and the lantern ring 141 to be aligned to the screw hole.

Figure 5:
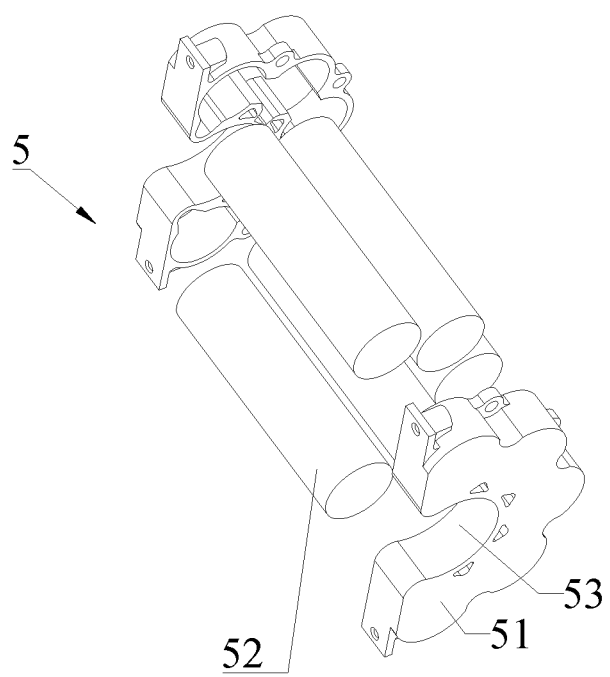
FIG. 5 is a structural view of a first power unit of the single-wheeled balance vehicle in Embodiment 1 of the invention.

Furthermore, as shown in FIG. 5, the first power unit comprises a bracket and a battery arranged on the bracket, the bracket has a receding groove for avoiding the lantern ring 141, and is fixed to the fixing plate 142 and located on the side, away from the PCB, of the fixing plate 142. The receding groove 53 is preferably in an arc shape. Understandably, the receding groove 53 avoids the lantern ring 141 means that the receding groove 53 avoids the spindle 4.

Similarly, the second control unit 8 also comprises a PCB, and the second power unit 6 also comprises a bracket, a battery, and the like.

Each pedal 1 comprises an arc-shaped shield plate 12 which shields one opening of the wheel 2 and is provided with anti-slip strips and a handle hole 13.

According to the single-wheeled balance vehicle of the invention, the power module and the control module are received in the wheel to be protected against accidental damage when the single-wheeled balance vehicle is impacted, and the service life of the single-wheeled balance vehicle is prolonged; the power module and the control module are arranged in the wheel, so the size of the single-wheeled balance vehicle is reduced; a shell is not needed, so that the production cost of the single-wheeled balance vehicle is reduced; power units are respectively arranged on the two sides of the motor housing, so that stress of the two ends of the spindle is balanced, and the layout of internal parts is facilitated; the end covers can further protect the power module and the control module; the end covers are provided with the third limit parts matched with the second limit parts, thus being able to transmit power to the wheel; the openings of the end covers face the motor housing, so that dust and moisture are prevented from entering the control (and/or power) module, the operating stability of the control module and the power module is guaranteed, and the service life of the single-wheeled balance vehicle is further prolonged; the wheel is limited between the two limit rings to be prevented against deviation; the first power unit and the first control unit are respectively located on the two sides of the fixing part, so that the space occupied by the control module and the power module is drastically reduced, and the miniaturization of the single-wheeled balance vehicle is facilitated; and the arc-shaped shield plates on the pedals can prevent dust from entering the balance vehicle via the openings of the wheel, so that the service life of the single-wheeled balance vehicle is further prolonged.

The above embodiments are only illustrative ones of the invention, and are not intended to limit the patent scope of the invention. All equivalent transformations made on the basis of the contents in the specification and drawings of the invention, or direct or indirect applications to relating technical fields should also fall within the protection scope of the invention.

The invention claimed is:

1. A single-wheeled balance vehicle, comprising:
a motor comprising a motor housing and a spindle;
pedals;
a wheel;
a power module comprising at least one power unit, and fixed to the spindle; and
a control module comprising at least one control unit electrically connected to the power unit and the motor, and fixed to the spindle;
wherein:
two ends of the spindle are fixedly connected to the pedals respectively;
the wheel is of a hollow structure having two ends formed with openings, is arranged on the motor housing in a sleeving manner and is fixedly connected to the motor housing;
the power module and the control module are located in the wheel;
first limit parts are arranged on an outer circumferential wall of the motor housing in an axial direction, and second limit parts matched with the first limit parts are arranged on an inner circumferential wall of the wheel; and
the single-wheeled balance vehicle further comprises two end covers rotatably arranged around the spindle, the motor housing is located between the two end covers, each said end cover is a cylindrical shell of a hollow structure having an end formed with an opening, an outer diameter of the end covers is equal to that of the motor housing, and the end covers are fixedly connected to the motor housing and are located in the wheel; and the power module and the control module are received in the hollow structures of the end covers.

2. The single-wheeled balance vehicle according to claim 1, wherein the wheel comprises a sleeve and a columnar lining, the sleeve is arranged outside the lining in a sleeving manner and is fixedly connected to the lining, and the lining is arranged on the motor housing in a sleeving manner and is fixedly connected to the motor housing, and the motor housing is located in a middle portion of the lining.

3. The single-wheeled balance vehicle according to claim 1, wherein third limit parts matched with the second limit parts are arranged on outer circumferential walls of the end covers and are in one-to-one correspondence with the first limit parts.

4. The single-wheeled balance vehicle according to claim 1, wherein the openings of the two end covers are arranged face to face.

5. The single-wheeled balance vehicle according to claim 4, wherein a limit ring is arranged at a bottom of each said end cover in a radial direction, and limit grooves matched with the limit rings are formed in the openings at the two ends of the wheel.

6. The single-wheeled balance vehicle according to claim 1, wherein the single-wheeled balance vehicle further comprises a fixing part, the spindle has a screw hole, the fixing part has a via hole aligned with the screw hole, the fixing part comprises a lantern ring and a fixing plate, the lantern ring is arranged around the spindle and is connected to the fixing plate, and the at least one control unit comprises a first control unit comprising a PCB fixed to the fixing plate.

7. The single-wheeled balance vehicle according to claim 6, wherein the power unit comprises a bracket and a battery arranged on the bracket, and the bracket has a receding groove for avoiding the lantern ring and is fixed to the fixing plate and located on a side, away from the PCB, of the fixing plate.

8. The single-wheeled balance vehicle according to claim 1, wherein each said pedal comprises an arc-shaped shield plate which shields one said opening of the wheel.

* * * * *